(12) United States Patent
Fang et al.

(10) Patent No.: US 12,047,327 B2
(45) Date of Patent: Jul. 23, 2024

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Yun Fang, Guangdong (CN); Wenhong Chen, Guangdong (CN); Zhihua Shi, Guangdong (CN); Yingpei Huang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 318 days.

(21) Appl. No.: 17/564,260

(22) Filed: Dec. 29, 2021

(65) Prior Publication Data

US 2022/0123912 A1 Apr. 21, 2022

Related U.S. Application Data

(63) Continuation of application No. PCT/CN2019/102913, filed on Aug. 27, 2019.

(51) Int. Cl.
*H04L 5/00* (2006.01)
(52) U.S. Cl.
CPC .......... *H04L 5/0064* (2013.01); *H04L 5/0032* (2013.01); *H04L 5/0053* (2013.01)
(58) Field of Classification Search
CPC ....... H04L 5/0082; H04L 5/00; H04L 5/0051; H04L 5/0053; H04L 5/0094; H04L 5/0048; H04W 72/23; H04W 48/12
See application file for complete search history.

(56) References Cited

U.S. PATENT DOCUMENTS

2019/0200332 A1* 6/2019 Hwang ................. H04L 5/0082

FOREIGN PATENT DOCUMENTS

| CN | 109863809 | 6/2019 |
| EP | 3471319 | 4/2019 |

(Continued)

OTHER PUBLICATIONS

OPPO, "Enhancements on multi-TRP and multi-panel transmission", 3GPP TSG RAN WG1 Meeting #98, Aug. 26-30, 2019, pp. 1-13.

(Continued)

*Primary Examiner* — Mahran Y Abu Roumi
(74) *Attorney, Agent, or Firm* — JCIP GLOBAL INC.

(57) ABSTRACT

A wireless communication method, a terminal device and a network device, the method comprising: a terminal device receiving first downlink control information (DCI), the first DCI being used to schedule the transmission of first data; the terminal device receiving the first data; according to the first DCI and first configuration information, the terminal device determining the target rate matching parameter configuration used by the first data, the first configuration information being used to indicate the association between a rate matching parameter configuration and a first control resource set (CORESET), and the first CORESET containing a CORESET that carries the first DCI; and the terminal device performing rate de-matching on the first data according to the target rate matching parameter configuration.

20 Claims, 5 Drawing Sheets

(56) References Cited

FOREIGN PATENT DOCUMENTS

| EP | 3804154 | 4/2021 |
|---|---|---|
| WO | 2019160375 | 8/2019 |

OTHER PUBLICATIONS

Spreadtrum Communications, "Discussion on Multi-TRP transmission", 3GPP TSG RAN WG1 #98, Aug. 26-30, 2019, pp. 1-12.

NTT Docomo, Inc et al., "Enhancements on multi-TRP/panel transmission", 3GPP TSG RAN WG1 #98, Aug. 26-30, 2019, pp. 1-36.

"Search Report of Europe Counterpart Application", issued on Mar. 11, 2022, p. 1-p. 9.

Zte, et al., "On remaining issues of rate matching", 3GPP TSG RAN WG1 Meeting AH 1801 R1-1800141, Jan. 22-26, 2018, pp. 1-5.

"International Search Report (Form PCT/ISA/210) of PCT/CN2019/102913", mailed on May 27, 2020, with English translation thereof, pp. 1-7.

"Written Opinion of the International Searching Authority (Form PCT/ISA/237) of PCT/CN2019/102913", mailed on May 27, 2020, with English translation thereof, pp. 1-6.

"Office Action of Europe Counterpart Application, Application No. 19943511.6", issued on Sep. 28, 2023, p. 1-p. 5.

\* cited by examiner

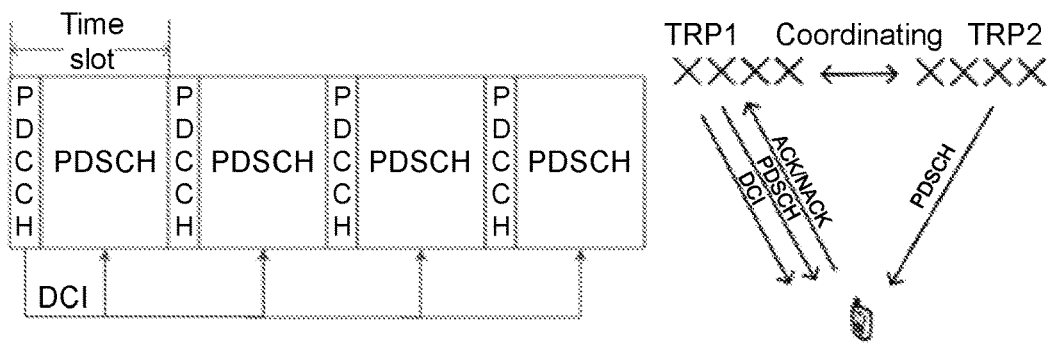

FIG. 4a          FIG. 4b

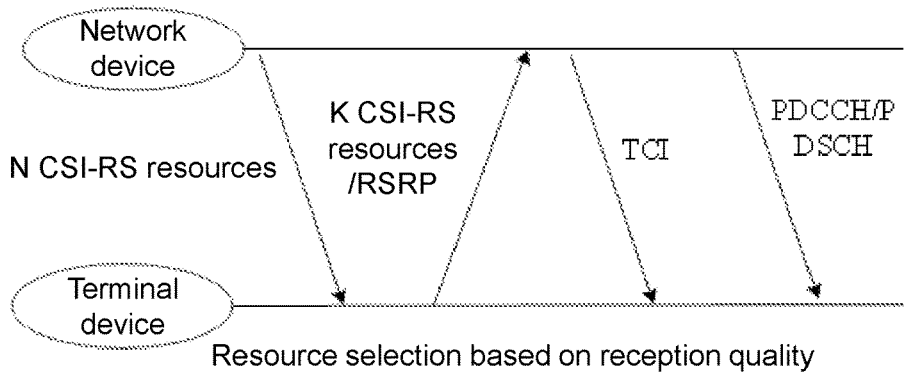

| A terminal device receives first downlink control information (DCI), the first DCI is used to schedule the transmission of first data | S210 |

| The terminal device receives the first data | S220 |

| The terminal device determines the target rate matching parameter configuration used by the first data according to the first DCI and first configuration information, where the first configuration information is used to indicate the association between a rate matching parameter configuration and a first control resource set (CORESET), and the first CORESET contains a CORESET that carries the first DCI | S230 |

| The terminal device performs rate de-matching on the first data according to the target rate matching parameter configuration | S240 |

FIG. 6

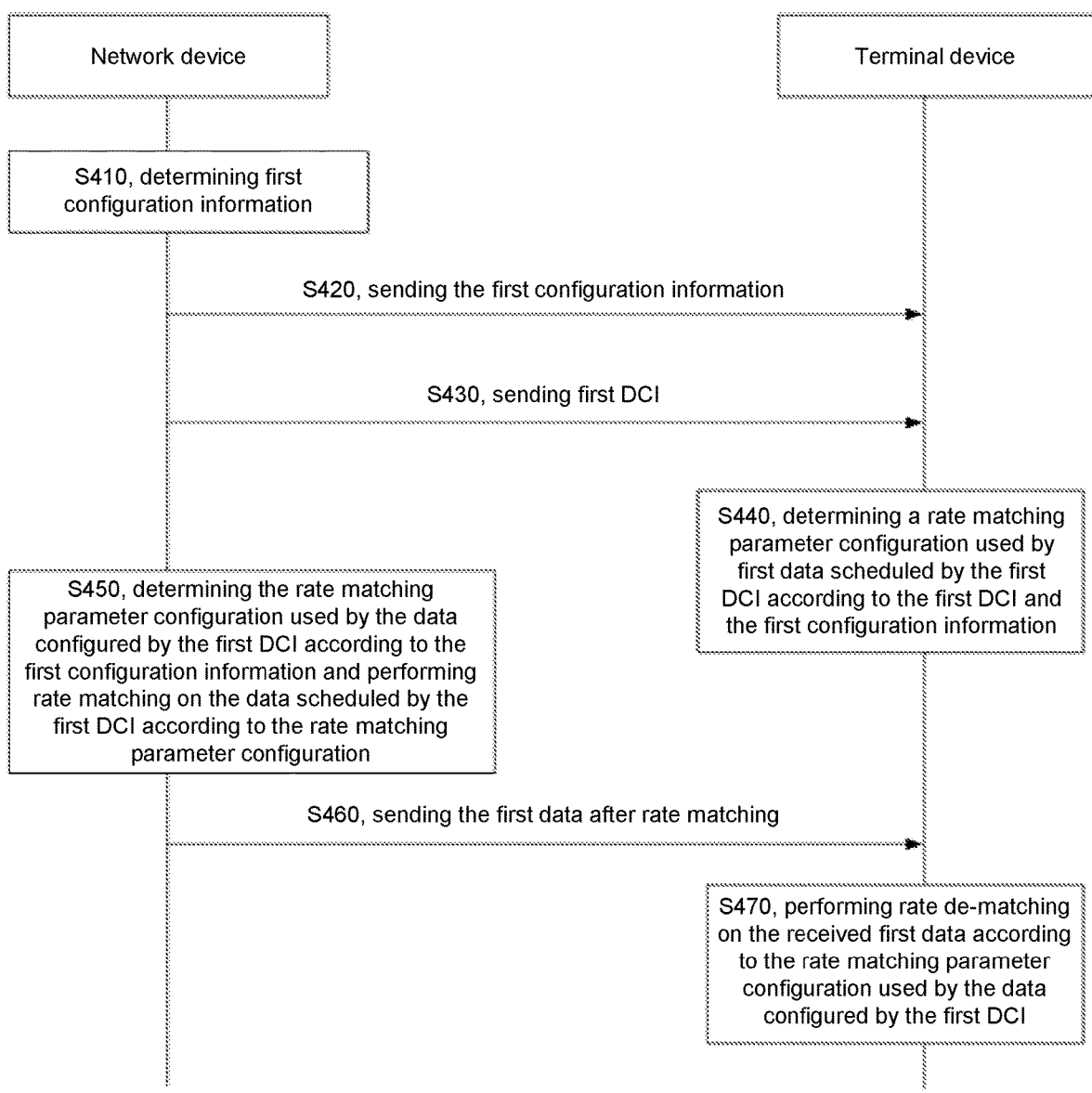

WIRELESS COMMUNICATION METHOD, TERMINAL DEVICE AND NETWORK DEVICE

CROSS-REFERENCE TO RELATED APPLICATION

This application is a continuation of international PCT application serial no. PCT/CN2019/102913, filed on Aug. 27, 2019. The entirety of the above-mentioned patent application is hereby incorporated by reference herein and made a part of this specification.

BACKGROUND

Technical Field

The embodiments of the disclosure relate to the field of communication, and in particular, to a wireless communication method, a terminal device, and a network device.

Description of Related Art

In the new radio (NR) system, the downlink non-coherent joint transmission (NC-JT) is introduced. In the downlink non-coherent joint transmission, multiple transmission points (TRPs) may use the same control channel to schedule the transmission of the physical downlink shared channel (PDSCH) of a terminal device. Herein, different TRPs simultaneously transmit data of different transmission layers. Alternatively, in another transmission mode, the TRPs may use different control channels to schedule the PDSCH transmission of a terminal device.

In the downlink non-coherent joint transmission, the terminal device uses a unified rate matching parameter configuration to perform rate de-matching on the PDSCHs or transmission layers transmitted by the TRPs, but if the TRPs are interfered by different signals, how to perform the rate de-matching to improve system performance is a problem that needs to be solved urgently.

SUMMARY

The embodiments of the disclosure provide a wireless communication method, a terminal device, and a network device through which system performance may be improved.

In the first aspect, the disclosure provides a wireless communication method, and the method includes the following steps. A terminal device receives first downlink control information (DCI) sent by a network device. The first DCI is used to schedule transmission of first data. The terminal device receives the first data. The terminal device determines a target rate matching parameter configuration used by the first data according to the first DCI and first configuration information. The first configuration information is used to indicate association between a rate matching parameter configuration and a first control resource set (CORESET), and the first CORESET contains a CORESET that carries the first DCI. The terminal device performs rate de-matching on the first data according to the target rate matching parameter configuration.

In the second aspect, the disclosure provides a wireless communication method, and the method includes the following steps. A network device sends first configuration information to a terminal device. The first configuration information is used to indicate association between a rate matching parameter configuration and a first control resource set (CORESET), and the first configuration information is used by the terminal device to determine a target rate matching parameter configuration used by the network device to send the first data.

In the third aspect, the disclosure provides a terminal device used for executing the first aspect or the method in any possible implementation of the first aspect. To be specific, the terminal device includes a unit for executing the first aspect or any possible implementation of the first aspect.

In the fourth aspect, the disclosure provides a network device used for executing the second aspect or the method in any possible implementation of the second aspect. To be specific, the network device includes a unit for executing the second aspect or any possible implementation of the second aspect.

In the fifth aspect, the disclosure provides a terminal device, and the terminal device includes a processor and a memory. The memory is used for storing a computer program, and the processor is used for calling and running the computer program stored in the memory to execute the first aspect or the method in the implementation thereof.

In the sixth aspect, the disclosure provides a network device, and the network device includes a processor and a memory. The memory is used for storing a computer program, and the processor is used for calling and running the computer program stored in the memory to execute the second aspect or the method in the implementation thereof.

In the seventh aspect, the disclosure provides a chip used for executing any aspect from the first aspect to the second aspect or the method in the implementation thereof.

To be specific, the chip includes a processor used to call and run a computer program from a memory, such that a device installed with the chip executes any aspect from the first aspect to the second aspect or the method in the implementation thereof.

In the eighth aspect, the disclosure provides a computer-readable storage medium used for storing a computer program, and the computer program enables a computer to execute any aspect from the first aspect to the second aspect or the method in the implementation thereof.

In the ninth aspect, the disclosure provides a computer program product including a computer program instruction, and the computer program instruction enables a computer to execute any aspect from the first aspect to the second aspect or the method in the implementation thereof.

In the tenth aspect, the disclosure provides a computer program, and when running on a computer, the computer program enables the computer to execute any aspect from the first aspect to the second aspect or the method in the implementation thereof.

Based on the technical solution provided above, the terminal device may determine the target rate matching parameter configuration used by the data scheduled by the DCI according to the received DCI sent by the network device in combination with the first configuration information, and further, may perform rate de-matching on the data according to the target rate matching parameter configuration when receiving the data scheduled by the DCI.

BRIEF DESCRIPTION OF THE DRAWINGS

FIG. 4a and FIG. 4b are schematic diagrams of two transmission modes of repeated transmission of a PDSCH.

FIG. 5 is a schematic interaction diagram of downlink beam management.

FIG. 6 is a schematic chart of a wireless communication method provided by an embodiment of the disclosure.

FIG. 7 is a schematic chart of another wireless communication method provided by an embodiment of the disclosure.

FIG. 8 is a schematic interaction diagram of a wireless communication method provided by an embodiment of the disclosure.

DESCRIPTION OF THE EMBODIMENTS

The technical solution in the embodiments of the disclosure will be described below in combination with the drawings in the embodiments of the disclosure. Obviously, the described embodiments are part of the embodiments of the disclosure, rather than all of the embodiments. Based on the embodiments in the disclosure, all other embodiments obtained by a person having ordinary skill in the art without creative effort shall fall within the protection scope of the disclosure.

It should be understood that the technical solution of the embodiments of the disclosure may be applied to various communication systems, such as a global system of mobile communication (GSM), a code division multiple access (CDMA) system, a wideband code division multiple access (WCDMA) system, a general packet radio service (GPRS), a long term evolution (LTE) system, a LTE frequency division duplex (FDD) system, a LTE time division duplex (TDD), an universal mobile telecommunication system (UMTS), a worldwide interoperability for microwave access (WiMAX) communication system, a new radio (NR) system, or a 5G system and the like.

In particular, the technical solution of the embodiments of the disclosure may be applied to various communication systems based on non-orthogonal multiple access technologies, such as a sparse code multiple access (SCMA) system, a low density signature (LDS) system, etc., and certainly, the SCMA system and the LDS system may also be called other names in the communication field. Further, the technical solution of the embodiments of the disclosure may be applied to a multi-carrier transmission system using non-orthogonal multiple access technology, such as an orthogonal frequency division multiplexing (OFDM) system using non-orthogonal multiple access technology, a filter bank multi-carrier (FBMC) system, a generalized frequency division multiplexing (GFDM) system, a filtered-OFDM (F-OFDM) system, and the like.

Figure 1:
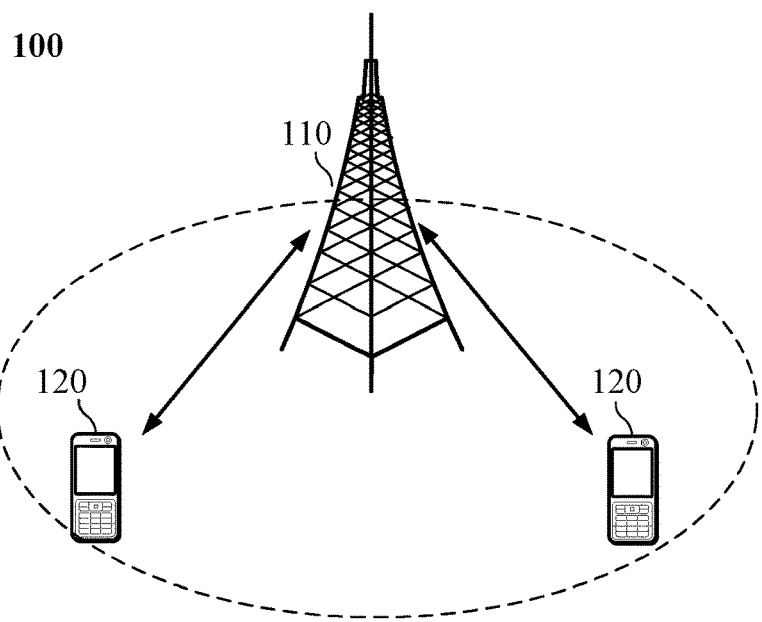
FIG. 1 is a schematic diagram of an application scenario provided by an embodiment of the disclosure.

Exemplarily, a communication system 100 applied in the embodiments of the disclosure is shown in FIG. 1. The communication system 100 may include a network device 110, and the network device 110 may be a device communicating with terminal devices 120 (or referred to as communication terminals or terminals). The network device 110 may provide communication coverage for a specific geographic area and may communicate with terminal devices located in this coverage area. Optionally, the network device 110 may be a base station (base transceiver station, BTS) in a GSM system or a CDMA system, a base station (NodeB, NB) in a WCDMA system, or an evolutional base station (evolutional Node B, eNB, or eNodeB) in an LTE system, or a wireless controller in a cloud radio access network (CRAN), or the network device may be a mobile switching center, a relay station, an access point, a vehicle-mounted device, a wearable device, a hub, a switch, a bridge, a router, a network device gNB in a 5G network, or a network device in a public land mobile network (PLMN) that evolves in the future.

The communication system 100 also includes at least one terminal device 120 located within the coverage area of the network device 110. As used herein, the "terminal device" includes but is not limited to user equipment (UE), access terminal, a user unit, a user station, a mobile station, a mobile platform, a remote station, a remote terminal, mobile equipment, a user terminal, a terminal, a wireless communication device, a user agent, or a user device. The access terminal may be a cellular phone, a cordless phone, a session initiation protocol (SIP) phone, a wireless local loop (WLL) station, a personal digital assistant (PDA), a handheld device with wireless communication functions, a computing device or other processing devices connected to a wireless modem, a vehicle-mounted device, a wearable device, a terminal device in a 5G network, or a terminal device in a public land mobile network (PLMN) that evolves in the future, which is not limited in the embodiments of the disclosure.

Optionally, device to device (D2D) communication may be performed between the terminal devices 120.

Optionally, the 5G system or 5G network may also be referred to as a new radio (NR) system or NR network.

FIG. 1 schematically illustrates one network device and two terminal devices, and optionally, the communication system 100 may include multiple network devices, and the coverage area of each network device may include other numbers of terminal devices, which is not limited in the embodiments of the disclosure.

Optionally, the communication system 100 may further include other network entities such as a network controller and a mobility management entity, which are not limited in the embodiments of the disclosure.

It should be understood that a device with a communication function in the network/system in the embodiments of the disclosure may be referred to as a communication device. Taking the communication system 100 shown in FIG. 1 as an example, the communication device may include the network device 110 and the terminal devices 120 having communication functions. The network device 110 and the terminal devices 120 may be the specific devices described above, and description thereof is not repeated herein. The communication device may also include other devices in the communication system 100, such as other network entities such as a network controller and a mobility management entity, which are not limited in the embodiments of the disclosure.

It should be understood that the terms "system" and "network" in the specification may be used interchangeably most of the time in the specification. The term "and/or" in the specification is merely an association relationship that describes the associated objects, indicating that there may be three types of relationships. For instance, A and/or B may mean that: A alone exists, A and B exist at the same time, and B exists alone. Besides, the character "/" in the specification generally indicates that the associated objects before and after are in an "or" relationship.

In the NR system, downlink non-coherent joint transmission (NC-JT) based on multiple transmission/reception points (TRPs) is introduced. Herein, backhaul connection among the TRPs may be ideal or non-ideal. In an ideal backhaul, the TRPs may exchange information quickly and dynamically, and in a non-ideal backhaul, the TRPs may only exchange information quasi-statically due to large delay.

Figure 2A:
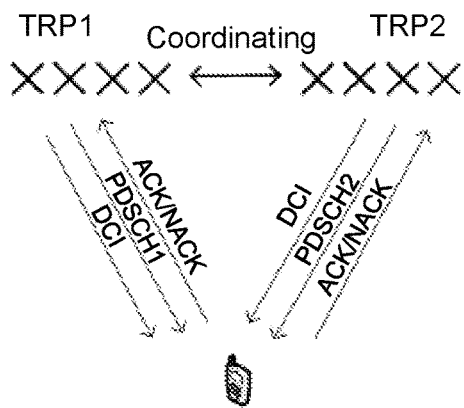
FIG. 2a and FIG. 2b are schematic diagrams of a transmission mode of downlink non-coherent joint transmission.
Figure 2B:
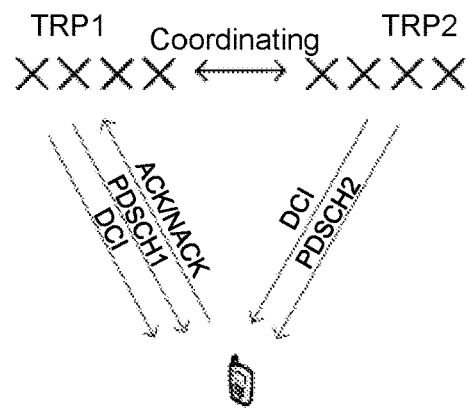

In the non-coherent joint transmission, the TRPs may use different control channels to independently schedule physical downlink shared channel (PDSCH) transmission of a terminal device, and a scheduled PDSCH may be transmitted in a same time slot or different time slots. The terminal device needs to support simultaneous reception of physical downlink control channels (DCCH) and PDSCHs from different TRPs. When the terminal device feeds back an acknowledgment/negative acknowledgment (ACK/NACK), as shown in FIG. 2a, the ACK/NACK may be fed back to different TRPs that transmit the corresponding PDSCHs, as shown in FIG. 2b, or may be combined and reported to one TRP. The former may be applied in ideal backhaul and non-ideal backhaul scenarios, and the latter may only be applied in ideal backhaul scenarios. Herein, the downlink control information (DCI) used to schedule the PDSCHs transmitted by different TRPs may be carried by different control resource sets (CORESETs), that is, multiple CORESETs are configured on a network side, and each TRP uses its own CORESET for scheduling, and different TRPs may thereby be distinguished through the CORESETs.

Figure 3A:
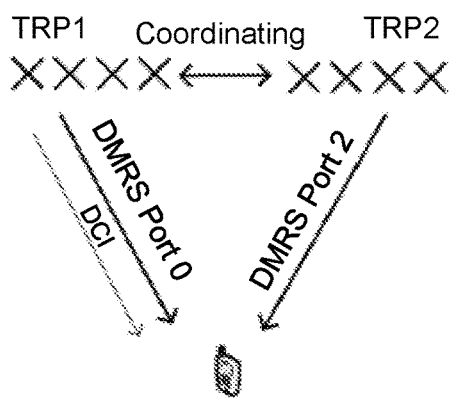
FIG. 3a and FIG. 3b are schematic diagrams of another transmission mode of downlink non-coherent joint transmission.
Figure 3B:
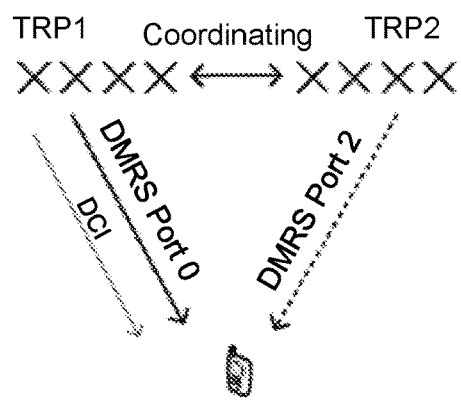

In another transmission mode, multiple TRPs may use the same control channel to independently schedule PDSCH transmission of a UE, and among them, different TRPs transmit data of different transmission layers, and terminal device needs to support simultaneous reception of PDSCH transmission layers from different TRPs. The data transmitted by different TRPs need to be configured with independent transmission configuration indicator (TCI) states and demodulation reference signal (DMRS) ports, and the different DMRS ports need to belong to different code division multiple (CDM) groups to ensure orthogonality between the DMRS ports, as shown in FIG. 3a. Alternatively, the network device may also dynamically select a TRP with favorable channel quality among the TRPs to transmit the PDSCH to prevent mutual interference from occurring, and this transmission mode is referred to as dynamic point switching (DPS), as shown in FIG. 3b.

It should be understood that the transmission layers of the PDSCHs transmitted by the TRPs may occupy a same time domain resource, for example, may occupy the same time slot or mini time slot. Optionally, in some embodiments, one mini slot may occupy multiple orthogonal frequency-division multiplexing (OFDM) symbols in a slot.

In the NR system, in order to improve transmission reliability of the PDSCHs, repeated transmission of the PDSCHs is introduced. For instance, the PDSCHs carrying the same data may be transmitted multiple times through different time slots, TRPs, or redundancy versions, etc., so as to obtain a diversity gain and reduce probability of false detection (BLER). In an implementation manner, the repeated transmission may be performed in multiple time slots (as shown in FIG. 4a) and may also be performed on multiple TRPs (as shown in FIG. 4b). Regarding repeated transmission of multiple slots, one DCI may schedule multiple PDSCHs carrying the same data for transmission on multiple consecutive time slots, using a same frequency domain resource. Regarding repeated transmission of multiple TRPs, the PDSCHs carrying the same data may be separately transmitted on different TRPs, for example, using different beams (in this case, multiple TCI states need to be indicated in one DCI, and each TCI state is used for one time of repeated transmission). Herein, the repeated transmission of multiple TRPs may also be combined with the repeated transmission of multiple time slots. For example, continuous time slots may be used for transmission, and different TRPs may be used for transmission in different time slots.

In the NR system, the network device may use an analog beam to transmit the physical downlink shared channel (PDSCH). Before analog beamforming is performed, the network device needs to determine the beam to be used through a downlink beam management process, and the downlink beam management process may be performed based on a channel state information reference signal (CSI-RS) or a synchronization signal block (SSB). As shown in FIG. 5, the network device (e.g., gNB) transmits N SSBs or N CSI-RS resources for beam management, where N is greater than 1. The terminal device performs measurement based on the N SSBs or N CSI-RS resources, selects K SSBs or CSI-RS resources with best reception quality, where K is greater than or equal to 1, and reports a corresponding SSB index or a CSI-RS resource index and corresponding reference signal receiving power (RSRP) to the network device. The network device determines a best SSB or CSI-RS resource according to the report of the terminal device, determines a transmission beam used by the network device as the transmission beam used for downlink transmission, and then uses the transmission beam to transmit a downlink control channel or a downlink data channel. Before transmitting a downlink control channel or a downlink data channel, the network device may indicate a corresponding quasi-co-location (QCL) reference signal to the terminal device through the TCI state, so that the terminal device may use a receiving beam used to receive the QCL reference signal to receive a corresponding downlink control channel, such as a physical downlink control channel (PDCCH) or a downlink data channel, for example, a physical downlink shared channel (PDSCH).

In the downlink non-coherent joint transmission, the terminal device uses a unified rate matching parameter configuration to perform rate de-matching on the received PDSCHs or transmission layers from the TRPs, but if the TRPs are interfered by different signals, how to perform the rate de-matching to improve system performance is a problem that needs to be solved urgently.

In view of this, the embodiments of the disclosure provide a technical solution that may configure a terminal device to perform the rate matching on data scheduled by different DCIs according to different rate matching parameter configurations, and in this way, interference to data transmission may be reduced, and system performance may be improved.

FIG. 6 is a schematic chart of a wireless communication method 200 provided by an embodiment of the disclosure. The method 200 may be executed by the terminal devices in the communication system shown in FIG. 1, and as shown in FIG. 6, the method 200 may include at least part of the following content.

In S210, a terminal device receives first downlink control information (DCI), and the first DCI is used to schedule transmission of first data.

In S220, the terminal device receives the first data.

In S230, according to the first DCI and first configuration information, the terminal device determines a target rate matching parameter configuration used by the first data, and herein, the first configuration information is used to indicate association between a rate matching parameter configuration and a first control resource set (CORESET), and the first CORESET contains a CORESET that carries the first DCI.

In S240, the terminal device performs rate de-matching on the first data according to the target rate matching parameter configuration.

Optionally, in some embodiments, the first data may be data in the PDSCH or data in the transmission layer of the PDSCH.

Optionally, the wireless communication method provided by the embodiments of the disclosure may be applied to a scenario of downlink non-coherent joint transmission or may also be applied to a scenario of repeated PDSCH transmission, which is not limited in the embodiments of the disclosure.

In the embodiments of the disclosure, the terminal device may receive first DCI sent by a first network device, and the first DCI is used to schedule transmission of the first data. Optionally, the terminal device may further receive second DCI sent by a second network device, and the second DCI is used to schedule transmission of the second data. Optionally, the first data and the second data may be the same data such as the PDSCHs carrying the same data, or the first data and the second data may be different data such as the PDSCHs carrying different data or data of different transmission layers of the same PDSCH, for example, the first data includes data of at least one transmission layer of the PDSCH, and the second data includes data of at least one transmission layer of the PDSCH.

In the embodiments of the disclosure, the network device may determine the association between the rate matching parameter configuration and the first control resource set (CORESET), that is, the first configuration information. Optionally, the first CORESET may include all CORESETs configured by the network device. When a network device may carry the DCI through a specific CORESET, the network device may use the rate matching parameter configuration corresponding to the CORESET to perform rate matching on the data to be transmitted. Correspondingly, the terminal device may determine the target rate matching parameter configuration used for rate de-matching the data scheduled by the DCI according to the CORESET carrying the DCI.

Optionally, in some embodiments, the rate matching parameter configuration may include at least one as follows: a long term evolution (LTE) cell reference signal (CRS) pattern, a physical downlink shared channel (PDSCH) rate matching pattern, and a zero power-channel state information reference signal (ZP-CSI-RS) resource.

Herein, the LTE CRS pattern may refer to a location of CRS transmission resources from the LTE network, and as an example, the LTE CRS pattern may be obtained through lte-CRS-ToMatchAround configured by the RRC parameters.

The PDSCH rate matching pattern is a physical resource dedicated to PDSCH rate matching, and as an example, the PDSCH rate matching pattern may be obtained through RateMatchPattern or RateMatchPatternGroup configured by the RRC parameters.

The ZP-CSI-RS resource may be a CSI-RS resource location without actual CSI-RS transmission, and as an example, the ZP-CSI-RS resource may be obtained through ZP-CSI-RS-Resource or ZP-CSI-RS-ResourceID configured by the RRC parameters, for example.

It should be understood that the abovementioned rate matching parameter configuration is only an example, and the rate matching parameter configuration may further include resource locations of other downlink channels or downlink signals that may interfere with downlink transmission, such as resource locations of synchronization channels, periodic CSI-RS, DMRS, or control channels, which are not limited in the embodiments of the disclosure.

In the following, implementation of the first configuration information is described in detail with reference to specific embodiments.

Embodiment 1

The first configuration information is used to indicate CORESET information corresponding to each rate matching parameter configuration configured by a network device.

As an example, the CORESET information is an identify (ID) of a control resource set (CORESET).

As another example, the CORESET information is a CORESET group index, where the CORESET group index may correspond to multiple CORESETs.

Method 1

The CORESET information corresponding to one rate matching parameter configuration includes a bitmap, and each bit in the bitmap corresponds to one CORESET or one CORESET group used to indicate whether the rate matching parameter configuration may be used for the PDSCH or the transmission layer scheduled by the DCI carried in the corresponding CORESET or CORESET group.

If N rate matching parameter configurations are included, each rate matching parameter configuration may correspond to a bitmap. Each bit in the bitmap corresponds to one CORESET or one CORESET group used, and a value of each bit may be used to indicate whether the rate matching parameter configuration may be used for the PDSCH or the transmission layer scheduled by the DCI carried in the CORESET or CORESET group. For instance, the value of this bit is 0, it indicates that the configuration may not be used for the PDSCH or the transmission layer scheduled by the DCI carried in the CORESET or CORESET group, and the value of this bit is 1, it indicates that the configuration may be used for the PDSCH or the transmission layer scheduled by the DCI carried in the CORESET or CORESET group.

Therefore, in Method 1, the first configuration information may configure a valid CORESET or CORESET group corresponding to each rate matching parameter configuration. The terminal device may determine the CORESET or CORESET group carrying the DCI according to the received DCI, may further determine a target rate matching parameter configuration that may be used for data scheduled by the DCI carried in the CORESET or CORESET group in the first configuration information, and may further perform rate de-matching on the data scheduled by the DCI according to the target rate matching parameter configuration.

Method 2

The CORESET information corresponding to one rate matching parameter configuration includes at least one CORESET group index, and the rate matching parameter is configured for the PDSCH scheduled by the DCI carried in the CORESET group corresponding to the at least one CORESET group index.

The CORESET information corresponding to one rate matching parameter configuration includes at least one CORESET ID, and the rate matching parameter configuration is used for the PDSCH scheduled by the DCI carried in the CORESET corresponding to the at least one CORESET ID.

In Method 2, the network device may configure a valid CORESET or CORESET group corresponding to each rate matching parameter configuration. The terminal device may determine the CORESET or CORESET group carrying the DCI according to the received DCI, may further determine a target rate matching parameter configuration that may be used for data scheduled by the DCI carried in the CORESET or CORESET group in the first configuration information, and may further perform rate de-matching on the data scheduled by the DCI according to the target rate matching parameter configuration.

Optionally, in the embodiments of the disclosure, the network device may configure a corresponding CORESET group index for each CORESET, and there may be multiple CORESETs corresponding to the same CORESET group index.

Embodiment 2

The first configuration information is used to determine a target rate matching parameter configuration corresponding to each CORESET information in the first CORESET.

Optionally, the target rate matching parameter configuration corresponding to each CORESET may be one or multiple.

Method 3

The first configuration information includes an index of the target rate matching parameter configuration in at least one rate matching parameter configuration pre-configured by a network device.

That is, the first configuration information may be the corresponding relationship between the CORESET information and the target rate matching parameter configuration. Each CORESET information may correspond to the corresponding target rate matching parameter configuration, and the target rate matching parameter configuration corresponding to each CORESET information may be one or more of the pre-configured rate matching parameter configurations.

As an example, the first configuration information may be the corresponding relationship between the CORESET ID and the index of the rate matching parameter configuration, indicating that the rate matching parameter configuration may be used for the PDSCH or the transmission layer scheduled by the DCI carried in the CORESET corresponding to the CORESET ID.

As another example, the first configuration information may be the corresponding relationship between the CORESET group index and the rate matching parameter configuration. It indicates that the rate matching parameter configuration may be used for the PDSCH or the transmission layer scheduled by the DCI carried in the CORESET group corresponding to the CORESET group index.

Method 4

The first configuration information includes a bitmap corresponding to each CORESET ID, and each bit in the bitmap corresponds to one rate matching parameter configuration used to indicate whether the rate matching parameter configuration may be used for the PDSCH scheduled by the DCI carried in the CORESET corresponding to the CORESET ID.

For instance, if M CORESET IDs are included, each CORESET ID may correspond to one bitmap, and each bit in the bitmap corresponds to one rate matching parameter configuration. If N rate matching parameter configurations are provided, the bitmap may include N bits, and the value of each bit may be used to indicate whether the corresponding rate matching parameter configuration is used for the PDSCH or the transmission layer scheduled by the DCI carried in the CORESET. For instance, the value of this bit is 0, it indicates that the configuration may not be used for the PDSCH or the transmission layer scheduled by the DCI carried in the CORESET, and the value of this bit is 1, it indicates that the configuration may be used for the PDSCH or the transmission layer scheduled by the DCI carried in the CORESET.

The first configuration information includes a bitmap corresponding to each CORESET group index, and each bit in the bitmap corresponds to one rate matching parameter configuration used to indicate whether the rate matching parameter configuration may be used for the PDSCH scheduled by the DCI carried in the CORESET corresponding to the CORESET group index.

For instance, if P CORESET group indexes are included, each CORESET group index may correspond to one bitmap, and each bit in the bitmap corresponds to one rate matching parameter configuration. If N rate matching parameter configurations are provided, the bitmap may include N bits, and the value of each bit may be used to indicate whether the corresponding rate matching parameter configuration is used for the PDSCH or the transmission layer scheduled by the DCI carried in the CORESET group corresponding to the CORESET group index. For instance, the value of this bit is 0, it indicates that the configuration may not be used for the PDSCH or the transmission layer scheduled by the DCI carried in the CORESET group, and the value of this bit is 1, it indicates that the configuration may be used for the PDSCH or the transmission layer scheduled by the DCI carried in the CORESET group.

Therefore, in Method 4, each CORESET ID or CORESET group index may correspond to the valid rate matching parameter configuration. The terminal device may determine the CORESET or CORESET group index carrying the DCI according to the received DCI, may further determine the target rate matching parameter configuration that may be used for the data scheduled by the DCI carried in the CORESET or CORESET group in combination with the first configuration information according to the CORESET ID or CORESET group index carrying the DCI, and may further perform rate de-matching on the data scheduled by the DCI according to the target rate matching parameter configuration.

Embodiment 3

The first configuration information includes multiple rate matching parameter configurations and a first bitmap, and the first bitmap includes multiple groups of bits. The groups of bits correspond to the rate matching parameter configurations one-to-one, and the value of each group of bits among the groups of bits is used to indicate a resource identify corresponding to a corresponding rate matching parameter configuration.

Assuming that N rate matching parameter configurations are included, the first bitmap includes N groups of bits. If the CORESET information occupies M bits, each group of bits in the first bitmap may occupy M bits, and the value of each group of bits among the N groups of bits is used to indicate the CORESET information corresponding to a corresponding rate matching parameter configuration. That is, the rate matching parameter configuration may be used for the PDSCH scheduled by the DCI carried in the CORESET corresponding to the CORESET information.

Taking N as 4, M as 2, and the CORESET information as CORESET ID as an example, the first bitmap may include 4 groups of bits, and each group of bits includes 2 bits used to indicate 4 types of CORESET ID, such as 00-11. The 4 groups of bits may correspond to one rate matching parameter configuration among the 4 rate matching parameter configurations. In an implementation manner, arrangement of the 4 groups of bits in the first bitmap may be made according to arrangement of the 4 rate matching parameter configurations. That is, the first group of bits is used to indicate the CORESET ID corresponding to the first rate matching parameter configuration, the second group of bits is used to indicate the CORESET ID corresponding to the second rate matching parameter configuration, and the rest may be deduced by analogy. If the value of the first group of bits is 00, the CORESET ID corresponding to the first rate matching parameter configuration is 00, and as another example, if the value of the third group of bits is 11, the CORESET ID corresponding to the third rate matching parameter configuration is 11.

If the terminal device receives the first DCI and the CORESET ID carrying the first DCI is 00, the terminal device may determine that the first rate matching parameter configuration is the rate matching parameter configuration used by the data scheduled by the first DCI.

Embodiment 4

The first configuration information includes multiple rate matching parameter configurations and a second bitmap, and the second bitmap includes multiple groups of bits. The groups of bits correspond to multiple pieces of CORESET information one-to-one, and the value of each group of bits among the groups of bits is used to indicate a rate matching parameter configuration corresponding to the corresponding CORESET information. That is, the rate matching parameter configuration may be used for the PDSCH scheduled by the DCI carried in the CORESET corresponding to the CORESET information.

The rate matching parameter configurations include N rate matching parameter configurations, the second bitmap includes M groups of bits, and M is a number of pieces of the CORESET information. If the index of the rate matching parameter configuration occupies K bits, each group of bits in the second bitmap occupies K bits, and the value of each group of bits among the M groups of bits is used to indicate a rate matching parameter configuration corresponding to the corresponding CORESET information.

Taking N as 4, M as 4, and the CORESET information as CORESET ID as an example, the second bitmap may include 4 groups of bits, and each group of bits includes 2 bits used to indicate the indexes of the 4 rate matching parameter configurations, such as 00-11. The 4 groups of bits in the second bitmap may correspond to one CORESET ID among the 4 CORESET IDs. In an implementation manner, the 4 groups of bits in the second bitmap may be arranged in an order of sizes of the 4 CORESET IDs. For instance, the value of the first group of bits is used to indicate the index of the rate matching parameter configuration corresponding to CORESET ID 00, the second group of bits is used to indicate the index of the rate matching parameter configuration corresponding to CORESET ID 01, and the rest may be deduced by analogy. For example, if the value of the first group of bits is 00, the identify of the rate matching parameter configuration corresponding to the CORESET ID 00 is 00, that is, corresponding to the first rate matching parameter configuration. For another example, if the value of the third group of bits is 11, the index of the rate matching parameter configuration corresponding to the CORESET ID 11 is 11, that is, corresponding to the fourth rate matching parameter configuration.

Following the above example, if the terminal device receives the first DCI, a resource for transmitting the first DCI corresponds to a resource identify 00. If in the second bitmap, the index of the rate matching parameter configuration corresponding to the resource identify 00 is 00, the terminal device may determine that the first rate matching parameter configuration is the rate matching parameter configuration used by the first network device to transmit the data scheduled by the first DCI.

In some embodiments, the network device may send the first configuration information to the terminal device through high-layer signaling. Optionally, the high-layer signaling may be radio resource control (RRC) signaling or a media access control element (MAC CE) and the like. In other words, the first configuration information may be RRC parameters or MAC CE information.

In some embodiments, the network device may send the first DCI to the terminal device, and the first DCI is used for scheduling transmission of the PDSCH or transmission of at least one transmission layer of the PDSCH.

Correspondingly, the terminal device may receive the first DCI sent by the network device, and further, the terminal device may determine the target rate matching parameter configuration used by the data scheduled by the first DCI according to the first DCI and the first configuration information configured by the network device.

On the network side, the network device may combine the first configuration information according to the CORESET information carrying the first DCI, determine the target rate matching parameter configuration used by the first data scheduled by the first DCI, may further perform rate matching on the first data according to the target rate matching parameter configuration, and sends the first data to the terminal device after rate matching is performed. To be specific, the network device determines a target rate matching resource corresponding to the data scheduled by the first DCI according to the target rate matching parameter configuration corresponding to the first data and further performs rate matching on the first data according to the target rate matching resource.

In some embodiments, the target rate matching parameter configuration include at least one as follows: a long term evolution (LTE) cell reference signal (CRS) pattern, a physical downlink shared channel (PDSCH) rate matching pattern, and a zero power-channel state information reference signal (ZP-CSI-RS) resource. In this way, the target rate matching resource may configure a corresponding physical resource for the target rate matching parameter, for example, may include at least one as follows: a physical resource corresponding to the LTE CRS pattern, a physical resource corresponding to the PDSCH rate matching pattern, and a zero-power ZP-CSI-RS resource.

Further, the network device may determine other physical resources other than the target rate matching resource as an available transmission resource for transmitting the first data, determine a target code rate used for channel coding the first data according to the available transmission resource, perform channel coding on the first data according to the target code rate, and then carry the channel-coded first data on the available transmission resource and sends the first data to the terminal device.

Correspondingly, after receiving the first DCI sent by the network device, the terminal device may determine the target rate matching parameter configuration used by the first data scheduled by the first DCI according to the first DCI together with the first configuration information and further determines the available transmission resource for the network device to transmit the first data. To be specific, the terminal device may determine the target rate matching resource according to the target rate matching parameter configuration and may further determine that other physical resources other than the target rate matching resource are the available transmission resource for the network device to transmit the first data. Further, the terminal device may receive the first data sent by the network device on the available transmission resource, determines the target code rate used by the network device for channel coding the first data according to the available transmission resource, and may further perform channel decoding on the first data according to the target code rate used by the network device to perform channel coding on the first data.

It should be understood that in the embodiments of the disclosure, the available transmission resource is not necessarily the physical resource for actual data transmission, and in some embodiments, the terminal device may also perform rate matching in combination with other signals or channels to determine the available transmission resource.

Therefore, in the embodiments of the disclosure, when the network device uses different CORESETs to schedule downlink transmission, the corresponding rate matching parameter configuration may be determined according to the first configuration information to perform rate matching on the data to be sent. Correspondingly, when receiving data scheduled by the DCI carried by different CORESETs, the terminal device may use the corresponding rate matching parameter configuration to perform rate de-matching, and in this way, scheduling flexibility may be improved, and best transmission performance may thus be achieved.

Further, when using a specific CORESET to send data, the network device only needs to perform rate matching according to the rate matching parameter configuration corresponding to the CORESET and does not need to perform rate matching according to the rate matching parameter configuration corresponding to other CORESETs, so that an available physical resource for downlink transmission may be accordingly increased. Furthermore, the use of different rate matching resources for rate matching for different DCI-scheduled data is beneficial to improve resource efficiency and may reduce interference to downlink transmission.

In combination with FIG. 6, the wireless communication method according to the embodiments of the disclosure is described in detail from the perspective of the terminal device, and in combination with FIG. 7, the following describes in detail the wireless communication method according to the embodiments of the disclosure from the perspective of the network device. It should be understood that the description on the network device side corresponds to the description on the terminal device side, and similar descriptions may be found with reference to the foregoing paragraphs. In order to avoid repetition, details are not repeated herein.

FIG. 7 is a schematic flow chart of a wireless communication method provided by an embodiment of the disclosure. A method 300 may be executed by the network device in the communication system shown in FIG. 1, and as shown in FIG. 7, the method 300 may include at least part of the following content.

In S310, the network device sends first configuration information to a terminal device. The first configuration information is used to indicate association between a rate matching parameter configuration and a first control resource set (CORESET), and the first configuration information is used by the terminal device to determine a target rate matching parameter configuration used by the network device to send the first data.

Optionally, in some embodiments, the first configuration information is used to indicate CORESET information corresponding to each rate matching parameter configuration configured by the network device.

Optionally, the CORESET information is a CORESET identify (ID) or a CORESET group index.

Optionally, in some embodiments, the CORESET information corresponding to one rate matching parameter configuration includes a bitmap, and each bit in the bitmap corresponds to one CORESET or one CORESET group used to indicate whether the rate matching parameter configuration may be used for a PDSCH or the transmission layer scheduled by the DCI carried in the corresponding CORESET or CORESET group.

Optionally, in some embodiments, the CORESET information corresponding to one rate matching parameter configuration includes at least one CORESET ID, and the rate matching parameter configuration is used for the PDSCH scheduled by the DCI carried in the CORESET corresponding to the CORESET ID. Alternatively, the CORESET information corresponding to one rate matching parameter configuration includes at least one CORESET group index, and the rate matching parameter is configured for the PDSCH scheduled by the DCI carried in the CORESET group corresponding to the CORESET group index.

Optionally, in some embodiments, the first configuration information is used to determine a target rate matching parameter configuration corresponding to each CORESET information in the first CORESET.

Optionally, in some embodiments, the first configuration information includes an index of the target rate matching parameter configuration in at least one rate matching parameter configuration pre-configured by the network device.

Alternatively, the first configuration information includes a bitmap corresponding to each CORESET, and each bit in the bitmap corresponds to one rate matching parameter configuration used to indicate whether the rate matching parameter configuration may be used for the PDSCH scheduled by the DCI carried in the CORESET.

Alternatively, the first configuration information includes a bitmap corresponding to each CORESET group, and each bit in the bitmap corresponds to one rate matching parameter configuration used to indicate whether the rate matching parameter configuration may be used for the PDSCH scheduled by the DCI carried in the CORESET group.

Optionally, in some embodiments, the method 300 may further include the following steps.

The network device sends high-layer signaling to the terminal device, and the high-layer signaling includes the first configuration information.

Optionally, in some embodiments, the high-layer signaling is radio resource control (RRC) signaling or a media access control (MAC) control element (CE).

Optionally, in some embodiments, the rate matching parameter configuration includes at least one as follows: a long term evolution (LTE) cell reference signal (CRS) pattern, a physical downlink shared channel (PDSCH) rate matching pattern, and a zero power-channel state information reference signal (ZP-CSI-RS) resource.

Optionally, in some embodiments, the first data is data of a physical downlink shared channel (PDSCH) or data of at least one transmission layer of the PDSCH.

In view of the above, in combination with FIG. 6 and FIG. 7, the wireless communication method according to the embodiments of the disclosure is described in detail from the perspectives of the terminal device and the network device, and hereinafter, in combination with FIG. 8, the wireless communication method according to the embodiments of the disclosure is described from the perspective of device interaction. As shown in FIG. 8, the method includes the following steps.

In S410, a network device determines the first configuration information.

That is, the network device may determine association between a rate matching parameter configuration and a first control resource set (CORESET). Specific implementation may be found with reference to description related to the method 200.

In S420, the network device sends the first configuration information to a terminal device.

The specific implementation process may be found with reference to description related to the method 200, and description thereof is not repeated herein for the sake of brevity.

In some embodiments, the network device sends first DCI, and the first DCI is used for scheduling transmission of a PDSCH or transmission of a transmission layer of the PDSCH.

Correspondingly, the terminal device receives the first DCI, and further, in S440, the terminal device may determine a target rate matching parameter configuration used by the PDSCH or the transmission layer scheduled by the first DCI according to the first DCI and the first configuration information. The specific implementation process may be found with reference to description related to the method 200, and description thereof is not repeated herein for the sake of brevity.

In step S450, the network device may determine the PDSCH scheduled by the first DCI or the target rate matching parameter configuration used by the transmission layer according to the CORESET carrying the first DCI and performs rate matching on the PDSCH or the transmission layer scheduled by the first DCI according to the target rate matching parameter configuration. The specific implementation process may be found with reference to description related to the method 200, and description thereof is not repeated herein for the sake of brevity.

Further, in step S460, the network device sends first data after the rate matching to the terminal device. The first data may be data of a physical downlink shared channel (PDSCH) or data of at least one transmission layer of the PDSCH.

Correspondingly, the terminal device receives multiple rate-matched PDSCHs or transmission layers sent by the network device.

In S470, the terminal device performs rate de-matching on the received PDSCHs or the transmission layers according to the target rate matching parameter configuration determined in S440.

The specific implementation process may be found with reference to description related to the method 200, and description thereof is not repeated herein for the sake of brevity.

The method embodiments of the disclosure are described in detail above with reference to FIG. 6 to FIG. 8, and the device embodiments of the disclosure are described in detail below in combination with FIG. 9 to FIG. 13. It should be understood that the device embodiments and the method embodiments correspond to each other, and similar descriptions may be found with reference to the method embodiments.

Figure 9:
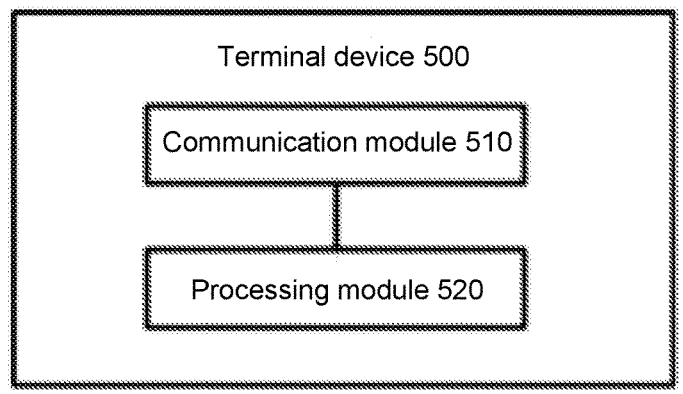
FIG. 9 is a schematic block view of a terminal device provided by an embodiment of the disclosure.

FIG. 9 is a schematic block view illustrating a terminal device 500 according to an embodiment of the disclosure. As shown in FIG. 9, the terminal device 500 includes the following.

A communication module 510 is used for receiving first downlink control information (DCI) used to schedule transmission of first data, and receives the first data.

A processing module 520 is used for determining a target rate matching parameter configuration used by the first data according to the first DCI and first configuration information. Herein, the first configuration information is used to indicate association between a rate matching parameter configuration and a first control resource set (CORESET), and the first CORESET contains a CORESET that carries the first DCI. The processing module 520 performs rate de-matching on the first data according to the target rate matching parameter configuration.

Optionally, in some embodiments, the first configuration information is used to indicate CORESET information corresponding to each rate matching parameter configuration configured by the network device.

Optionally, in some embodiments, the CORESET information is a CORESET identify (ID) or a CORESET group index.

Optionally, in some embodiments, the CORESET information corresponding to one rate matching parameter configuration includes a bitmap, and each bit in the bitmap corresponds to one CORESET or one CORESET group used to indicate whether the rate matching parameter configuration may be used for a PDSCH or the transmission layer scheduled by the DCI carried in the corresponding CORESET or CORESET group.

Optionally, in some embodiments, the CORESET information corresponding to one rate matching parameter configuration includes at least one CORESET ID, and the rate matching parameter configuration is used for the PDSCH scheduled by the DCI carried in the CORESET corresponding to the CORESET ID. Alternatively, the CORESET information corresponding to one rate matching parameter configuration includes at least one CORESET group index, and the rate matching parameter is configured for the PDSCH scheduled by the DCI carried in the CORESET group corresponding to the CORESET group index.

Optionally, in some embodiments, the first configuration information is used to determine a target rate matching parameter configuration corresponding to each CORESET information in the first CORESET.

Optionally, in some embodiments, the first configuration information includes an index of the target rate matching parameter configuration in at least one rate matching parameter configuration pre-configured by the network device.

Alternatively, the first configuration information includes a bitmap corresponding to each CORESET, and each bit in the bitmap corresponds to one rate matching parameter configuration used to indicate whether the rate matching parameter configuration may be used for the PDSCH scheduled by the DCI carried in the CORESET.

Alternatively, the first configuration information includes a bitmap corresponding to each CORESET group, and each bit in the bitmap corresponds to one rate matching parameter configuration used to indicate whether the rate matching parameter configuration may be used for the PDSCH scheduled by the DCI carried in the CORESET group.

Optionally, in some embodiments, the communication module 510 is further configured for:

receiving high-layer signaling, where the high-layer signaling includes the first configuration information.

Optionally, in some embodiments, the high-layer signaling is radio resource control (RRC) signaling or a media access control (MAC) control element (CE).

Optionally, in some embodiments, the rate matching parameter configuration includes at least one as follows:

a long term evolution (LTE) cell reference signal (CRS) pattern, a physical downlink shared channel (PDSCH) rate matching pattern, and a zero power-channel state information reference signal (ZP-CSI-RS) resource.

Optionally, in some embodiments, the first data is data of a physical downlink shared channel (PDSCH) or data of at least one transmission layer of the PDSCH.

It should be understood that the terminal device 500 according to the embodiments of the disclosure may correspond to the terminal device in the method embodiments of the disclosure, the foregoing and other operations and/or functions of each unit in the terminal device 500 are used to implement the corresponding process of the terminal device in the method 200 shown in FIG. 6 or the method 400 shown in FIG. 8, and for the sake of brevity, description thereof is not repeated herein.

Figure 10:
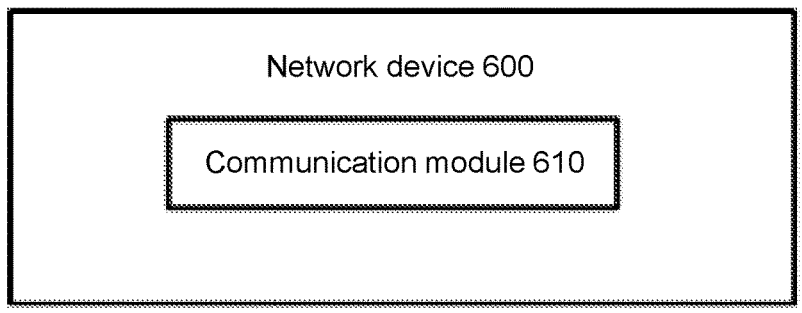
FIG. 10 is a schematic block view of a network device provided by an embodiment of the disclosure.

FIG. 10 is a schematic block view illustrating a network device 600 according to an embodiment of the disclosure. As shown in FIG. 10, the network device 600 includes the following.

A communication module 610 is used for sending first configuration information to a terminal device. The first configuration information is used to indicate association between a rate matching parameter configuration and a first control resource set (CORESET), and the first configuration information is used by the terminal device to determine a target rate matching parameter configuration used by the network device to send the first data.

Optionally, in some embodiments, the first configuration information is used to indicate CORESET information corresponding to each rate matching parameter configuration configured by the network device.

Optionally, in some embodiments, the CORESET information is a CORESET identify (ID) or a CORESET group index.

Optionally, in some embodiments, the CORESET information corresponding to one rate matching parameter configuration includes a bitmap, and each bit in the bitmap corresponds to one CORESET or one CORESET group used to indicate whether the rate matching parameter configuration may be used for a PDSCH or the transmission layer scheduled by the DCI carried in the corresponding CORESET or CORESET group.

Optionally, in some embodiments, the CORESET information corresponding to one rate matching parameter configuration includes at least one CORESET ID, and the rate matching parameter configuration is used for the PDSCH scheduled by the DCI carried in the CORESET corresponding to the CORESET ID. Alternatively, the CORESET information corresponding to one rate matching parameter configuration includes at least one CORESET group index, and the rate matching parameter is configured for the PDSCH scheduled by the DCI carried in the CORESET group corresponding to the CORESET group index.

Optionally, in some embodiments, the first configuration information is used to determine a target rate matching parameter configuration corresponding to each CORESET information in the first CORESET.

Optionally, in some embodiments, the first configuration information includes an index of the target rate matching parameter configuration in at least one rate matching parameter configuration pre-configured by the network device.

Alternatively, the first configuration information includes a bitmap corresponding to each CORESET, and each bit in the bitmap corresponds to one rate matching parameter configuration used to indicate whether the rate matching parameter configuration may be used for the PDSCH scheduled by the DCI carried in the CORESET.

Alternatively, the first configuration information includes a bitmap corresponding to each CORESET group, and each bit in the bitmap corresponds to one rate matching parameter configuration used to indicate whether the rate matching parameter configuration may be used for the PDSCH scheduled by the DCI carried in the CORESET group.

Optionally, in some embodiments, the communication module 610 is further configured for:

sending high-layer signaling to the terminal device, where the high-layer signaling includes the first configuration information.

Optionally, in some embodiments, the high-layer signaling is radio resource control (RRC) signaling or a media access control (MAC) control element (CE).

Optionally, in some embodiments, the rate matching parameter configuration includes at least one as follows:

a long term evolution (LTE) cell reference signal (CRS) pattern, a physical downlink shared channel (PDSCH) rate matching pattern, and a zero power-channel state information reference signal (ZP-CSI-RS) resource.

Optionally, in some embodiments, the first data is data of a physical downlink shared channel (PDSCH) or data of at least one transmission layer of the PDSCH.

It should be understood that the network device 600 according to the embodiments of the disclosure may correspond to the network device in the method embodiments of the disclosure, the foregoing and other operations and/or functions of each unit in the network device 600 are used to implement the corresponding process of the network device in the method 300 shown in FIG. 7 or the method 400 shown in FIG. 8, and for the sake of brevity, description thereof is not repeated herein.

Figure 11:
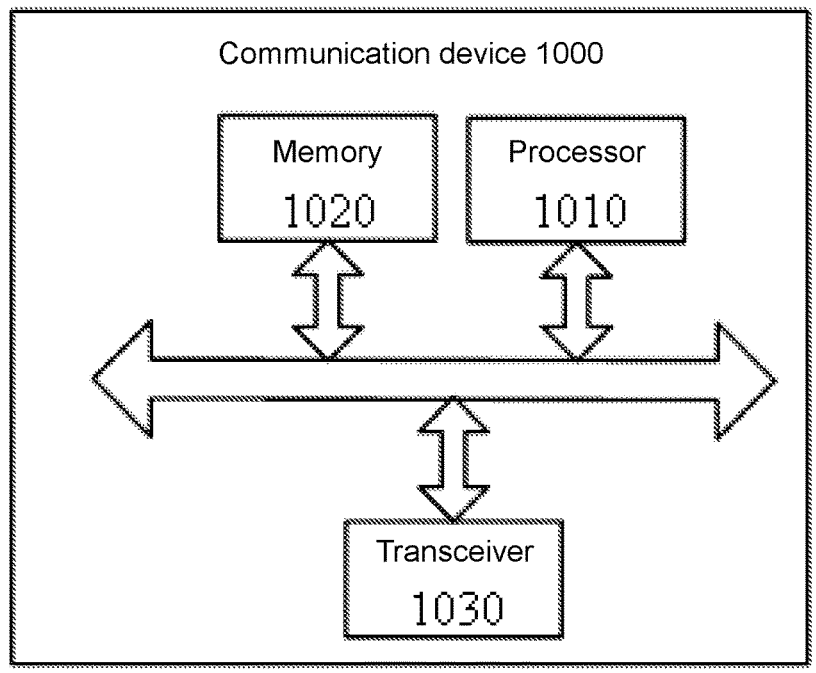
FIG. 11 is a schematic block view of a communication device provided by another embodiment of the disclosure.

FIG. 11 is a schematic view of a structure of a communication device 1000 provided by an embodiment of the disclosure. The communication device 1000 shown in FIG. 11 includes a processor 1010, and the processor 1010 may call and run a computer program from a memory to implement the method in the embodiments of the disclosure.

Optionally, as shown in FIG. 11, the communication device 1000 may further include a memory 1020. The processor 1010 may call and run a computer program from the memory 1020 to implement the method in the embodiments of the disclosure.

The memory 1020 may be a separate device independent of the processor 1010 or may be integrated in the processor 1010.

Optionally, as shown in FIG. 11, the communication device 1000 may further include a transceiver 1030, and the processor 1010 may control the transceiver 1030 to communicate with other devices, and specifically, may send information or data to other devices or receive information or data sent by other devices.

The transceiver 1030 may include a transmitter and a receiver. The transceiver 1030 may further include an antenna, and a number of antennas may be one or more.

Optionally, the communication device 1000 may specifically be the network device in the embodiments of the disclosure, and the communication device 1000 may implement the corresponding processes implemented by the network device in the various methods in the embodiments of the disclosure. For the sake of brevity, description thereof is not repeated herein.

Optionally, the communication device 1000 may specifically be a mobile terminal/the terminal device in the embodiments of the disclosure, and the communication device 1000 may implement the corresponding process flows implemented by the mobile terminal/terminal device in the various methods in the embodiments of the disclosure. For the sake of brevity, description thereof is not repeated herein.

Figure 12:
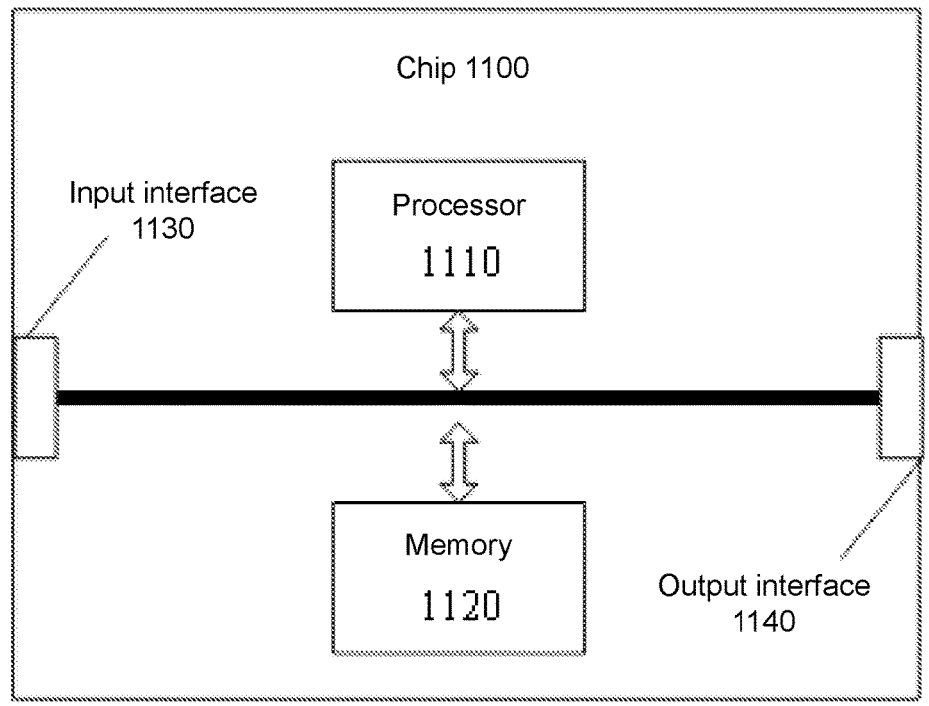
FIG. 12 is a schematic block view of a chip provided by an embodiment of the disclosure.

FIG. 12 is a schematic view of a structure of a chip according to an embodiment of the disclosure. A chip 1100 shown in FIG. 12 includes a processor 1110, and the processor 1110 may call and run a computer program from a memory to implement the method in the embodiments of the disclosure.

Optionally, as shown in FIG. 12, the chip 1100 may further include a memory 1120. Herein, the processor 1110 may call and run a computer program from the memory 1120 to implement the method in the embodiments of the disclosure.

Herein, the memory 1120 may be a separate device independent of the processor 1110 or may be integrated in the processor 1110.

Optionally, the chip 1100 may further include an input interface 1130. Herein, the processor 1110 may control the input interface 1130 to communicate with other devices or chips, and specifically, may obtain information or data sent by other devices or chips.

Optionally, the chip 1100 may further include an output interface 1140. Herein, the processor 1110 may control the output interface 1140 to communicate with other devices or chips, and specifically, may output information or data to other devices or chips.

Optionally, the chip may be applied to the network device in the embodiments of the disclosure, and the chip may implement the corresponding process flows implemented by the network device in the various methods in the embodiments of the disclosure. For the sake of brevity, description thereof is not repeated herein.

Optionally, the chip may be applied to the mobile terminal/terminal device in the embodiments of the disclosure, and the chip may implement the corresponding process flows implemented by the mobile terminal/terminal device in the various methods in the embodiments of the disclosure. For the sake of brevity, description thereof is not repeated herein.

It should be understood that the chip mentioned in the embodiments of the disclosure may also be referred to as a system-level chip or a system on a chip.

Figure 13:
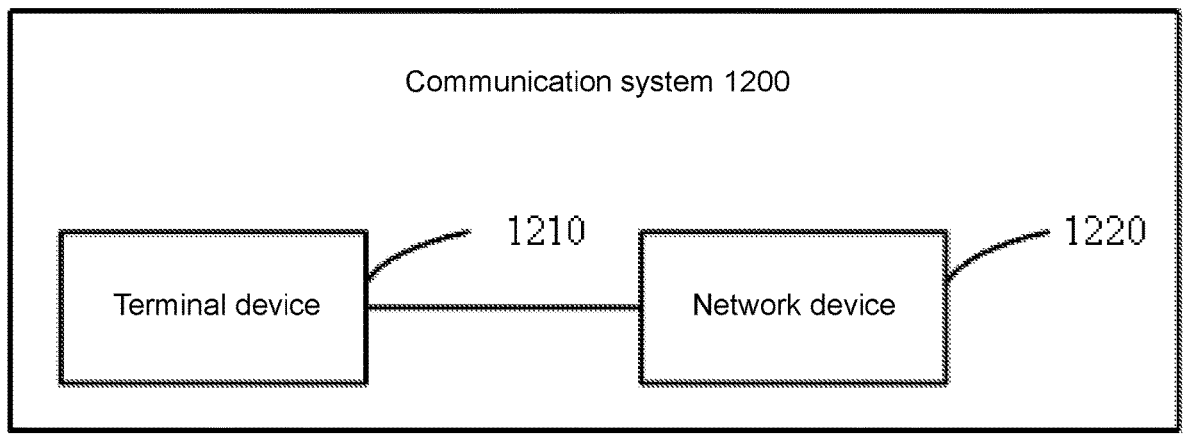
FIG. 13 is a schematic block view of a communication system provided by an embodiment of the disclosure.

FIG. 13 is a schematic block view of a communication system 1200 provided by an embodiment of the disclosure. As shown in FIG. 13, the communication system 1200 includes a terminal device 1210 and a network device 1220.

Herein, the terminal device 1210 may be used to implement the corresponding functions implemented by the terminal device in the foregoing method, and the network device 1220 may be used to implement the corresponding functions implemented by the network device in the foregoing method. For the sake of brevity, description thereof is not repeated herein.

It should be understood that the processor of the embodiments of the disclosure may be an integrated circuit chip with signal processing capability. In the implementation process, the steps of the foregoing method in the embodiments may be completed by an integrated logic circuit of hardware or an instruction in the form of software in the processor. The processor may be a general-purpose processor, a digital signal processor (DSP), an application specific integrated circuit (ASIC), a field programmable gate array (FPGA), or other components such as a programmable logic device, a discrete gate, a transistor logic device, and a discrete hardware component. The processor may implement or execute various methods, steps, and logical block views disclosed in the embodiments of the disclosure. The general-purpose processor may be a microprocessor, or the processor may be any conventional processor and the like. The steps of the method disclosed in the embodiments of the disclosure may be directly implemented as being executed and completed by a hardware decoding processor, or may be executed and completed by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads the information in the memory and completes the steps of the foregoing method in combination with its hardware.

It may be understood that the memory in the embodiments of the disclosure may be a volatile memory or a non-volatile memory or may include both the volatile memory and the non-volatile memory. The non-volatile memory may be a ready-only memory (ROM), a programmable ROM (PROM), an erasable PROM (EPROM), an electrically EPROM (EEPROM), or a flash memory. The volatile memory may be a random access memory (RAM) used as an external cache. By way of exemplary but not restrictive description, many forms of the RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DRRAM). It should be noted that the memory of the system and the method described herein is intended to include, but not limited to, these and any other suitable types of memories.

It should be understood that the above-mentioned memory is exemplary but not restrictive. For instance, the memory in the embodiments of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM) and the like. That is, the memory in the embodiments of the disclosure is intended to include, but not limited to, these and any other suitable types of memory.

The embodiments of the disclosure further provide a computer-readable storage medium configured for storing a computer program.

Optionally, the computer-readable storage medium may be applied to the network device in the embodiments of the disclosure, and the computer program causes a computer to execute the corresponding processes implemented by the network device in the various methods of the embodiments of the disclosure. For the sake of brevity, description thereof is not repeated herein.

Optionally, the computer-readable storage medium may be applied to the mobile terminal/terminal device in the embodiments of the disclosure, and the computer program causes a computer to execute the corresponding processes implemented by the mobile terminal/terminal device in the various methods of the embodiments of the disclosure. For the sake of brevity, description thereof is not repeated herein.

The embodiments of the disclosure further provide a computer program product including a computer program instruction.

Optionally, the computer program product may be applied to the network device in the embodiments of the disclosure, and the computer program instruction causes the computer to execute the corresponding processes implemented by the network device in the various methods of the embodiments of the disclosure. For the sake of brevity, description thereof is not repeated herein.

Optionally, the computer program product may be applied to the mobile terminal/terminal device in the embodiments of the disclosure, and the computer program instruction causes a computer to execute the corresponding processes implemented by the mobile terminal/terminal device in the various methods of the embodiments of the disclosure. For the sake of brevity, description thereof is not repeated herein.

The embodiments of the disclosure further provide a computer program.

Optionally, the computer program may be applied to the network device in the embodiments of the disclosure, and when running on a computer, the computer program causes the computer to execute the corresponding processes implemented by the network device in the various methods of the embodiments of the disclosure. For the sake of brevity, description thereof is not repeated herein.

Optionally, the computer program may be applied to the mobile terminal/terminal device in the embodiments of the disclosure, and when running on a computer, the computer program causes the computer to execute the corresponding processes implemented by the mobile terminal/terminal device in the various methods of the embodiments of the disclosure. For the sake of brevity, description thereof is not repeated herein.

A person having ordinary skill in the art may be aware that in combination with the disclosed embodiments, the described exemplary units and algorithm steps may be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered beyond the scope of the disclosure.

A person having ordinary skill in the art may clearly understand that, for the convenience and brevity of description, the specific working process of the abovementioned system, device, and unit may refer to the corresponding processes in the foregoing method embodiments, which are not repeated herein.

In the several embodiments provided in the disclosure, it should be understood that the disclosed system, device, and method may be implemented in other ways. For instance, the device embodiments described above are only illustrative. For instance, the division of the units is only a logical function division, and there may be other division methods in actual implementation. For instance, multiple units or components may be combined or integrated into another system, or some features may be omitted or may not be implemented. In addition, the displayed or discussed mutual coupling or direct coupling or communication connection may be implemented through some interfaces, and the indirect coupling or communication connection of the device or units may be in electrical, mechanical, or other forms.

The units described as separate components may or may not be physically separated, and the components displayed as units may or may not be physical units, that is, they may be located in one place, or they may be distributed on multiple network units. Some of or all of the units may be selected according to actual needs to achieve the objectives of the solutions of the embodiments.

In addition, in the embodiments of the disclosure, each functional unit may be integrated into one processing unit, or each unit may exist alone physically, or two or more units may be integrated into one unit.

If the function is implemented in the form of a software functional unit and sold or used as an independent product, it may be stored in a computer-readable storage medium. Based on this understanding, regarding the technical solution of the disclosure, the part that contributes to the related art or the part of the technical solution may be embodied in the form of a software product in essence. The computer software product is stored in a storage medium and includes a number of instructions to enable a computer device (which may be a personal computer, a server, or the network device and the like) to execute all or part of the steps of the method described in the various embodiments of the disclosure. The aforementioned storage medium includes a U disk, a mobile hard disk, a read-only memory (ROM), a random access memory (RAM), a magnetic disk, an optical disk, or other media that may store program codes.

The above are only specific implementations of the disclosure, but the protection scope of the disclosure is not limited thereto. A person having ordinary skill in the art may easily think of changes or substitutions within the technical scope disclosed in the disclosure, and these changes or substitutions should be covered by the protection scope of the disclosure. Therefore, the protection scope of the disclosure shall be subject to the protection scope of the claims.

What is claimed is:

1. A wireless communication method, comprising:
receiving, by a terminal device, first downlink control information (DCI), wherein the first DCI is used to schedule transmission of first data;
receiving, by the terminal device, the first data;
determining, by the terminal device, a target rate matching parameter configuration used by the first data according to the first DCI and first configuration information, wherein the first configuration information is used to indicate association between a rate matching parameter configuration and a first control resource set (CORESET), the first configuration information includes a bitmap, one bit in the bitmap corresponds to the first CORESET, the first configuration information configures a value of the bit to indicate the rate matching parameter configuration is used for the first CORESET and another value of the bit to indicate the rate matching parameter configuration is not used for the first CORESET, and the first CORESET contains a CORESET that carries the first DCI; and performing, by the terminal device, rate de-matching on the first data according to the target rate matching parameter configuration.

2. The method according to claim 1, wherein the first configuration information is used to indicate CORESET information corresponding to each rate matching parameter configuration configured by a network device.

3. The method according to claim 2, wherein the CORESET information corresponding to one rate matching parameter configuration comprises at least one CORESET ID, and the rate matching parameter configuration is used for a PDSCH scheduled by DCI carried in the CORESET corresponding to the CORESET ID, or the CORESET information corresponding to one rate matching parameter configuration comprises at least one CORESET group index, and the rate matching parameter is configured for a PDSCH scheduled by DCI carried in the CORESET group corresponding to the CORESET group index.

4. The method according to claim 1, wherein the method further comprises:

receiving, by the terminal device, high-layer signaling, wherein the high-layer signaling comprises the first configuration information, and the high-layer signaling is radio resource control (RRC) signaling or a media access control (MAC) control element (CE).

5. The method according to claim 1, wherein the rate matching parameter configuration comprises at least one as follows:

a long term evolution (LTE) cell reference signal (CRS) pattern, a physical downlink shared channel (PDSCH) rate matching pattern, and a zero power-channel state information reference signal (ZP-CSI-RS) resource.

6. The method according to claim 1, wherein the first data is data of a physical downlink shared channel (PDSCH) or data of at least one transmission layer of the PDSCH.

7. A terminal device, comprising:

a communication circuit, used for receiving first downlink control information (DCI), wherein the first DCI is used to schedule transmission of first data, and receiving the first data; and a processor, used for determining a target rate matching parameter configuration used by the first data according to the first DCI and first configuration information, wherein the first configuration information is used to indicate association between a rate matching parameter configuration and a first control resource set (CORESET), the first configuration information includes a bitmap, one bit in the bitmap corresponds to the first CORESET, the first configuration information configures a value of the bit to indicate the rate matching parameter configuration is used for the first CORESET and another value of the bit to indicate the rate matching parameter configuration is not used for the first CORESET, and the first CORESET contains a CORESET that carries the first DCI, and performing rate de-matching on the first data according to the target rate matching parameter configuration.

8. The terminal device according to claim 7, wherein the first configuration information is used to indicate CORESET information corresponding to each rate matching parameter configuration configured by a network device.

9. The terminal device according to claim 8, wherein the CORESET information is a CORESET identify (ID) or a CORESET group index.

10. The terminal device according to claim 8, wherein the CORESET information corresponding to one rate matching parameter configuration comprises at least one CORESET ID, and the rate matching parameter configuration is used for a PDSCH scheduled by DCI carried in the CORESET corresponding to the CORESET ID, or the CORESET information corresponding to one rate matching parameter configuration comprises at least one CORESET group index, and the rate matching parameter is configured for a PDSCH scheduled by DCI carried in the CORESET group corresponding to the CORESET group index.

11. The terminal device according to claim 7, wherein the communication circuit is further used for:

receiving high-layer signaling, wherein the high-layer signaling comprises the first configuration information, and the high-layer signaling is radio resource control (RRC) signaling or a media access control (MAC) control element (CE).

12. The terminal device according to claim 7, wherein the rate matching parameter configuration comprises at least one as follows:

a long term evolution (LTE) cell reference signal (CRS) pattern, a physical downlink shared channel (PDSCH) rate matching pattern, and a zero power-channel state information reference signal (ZP-CSI-RS) resource.

13. The terminal device according to claim 7, wherein the first data is data of a physical downlink shared channel (PDSCH) or data of at least one transmission layer of the PDSCH.

14. A network device, comprising:

a communication circuit, used for sending first configuration information to a terminal device, wherein the first configuration information is used to indicate association between a rate matching parameter configuration and a first control resource set (CORESET), the first configuration information includes a bitmap, one bit in the bitmap corresponds to the first CORESET, the first configuration information configures a value of the bit to indicate the rate matching parameter configuration is used for the first CORESET and another value of the bit to indicate the rate matching parameter configuration is not used for the first CORESET, and the first configuration information is used by the terminal device to determine a target rate matching parameter configuration used by the network device to send first data.

15. The network device according to claim 14, wherein the first configuration information is used to indicate CORESET information corresponding to each rate matching parameter configuration configured by the network device.

16. The network device according to claim 15, wherein the CORESET information is a CORESET identify (ID) or a CORESET group index.

17. The network device according to claim 15, wherein the CORESET information corresponding to one rate matching parameter configuration comprises at least one CORESET ID, and the rate matching parameter configuration is used for a PDSCH scheduled by DCI carried in the CORESET corresponding to the CORESET ID, or the CORESET information corresponding to one rate matching parameter configuration comprises at least one CORESET group index, and the rate matching parameter is configured for a PDSCH scheduled by DCI carried in the CORESET group corresponding to the CORESET group index.

18. The network device according to claim 14, wherein the communication circuit is further used for:

sending high-layer signaling to the terminal device, wherein the high-layer signaling comprises the first configuration information, and the high-layer signaling is radio resource control (RRC) signaling or a media access control (MAC) control element (CE).

19. The network device according to claim 14, wherein the rate matching parameter configuration comprises at least one as follows:

a long term evolution (LTE) cell reference signal (CRS) pattern, a physical downlink shared channel (PDSCH) rate matching pattern, and a zero power-channel state information reference signal (ZP-CSI-RS) resource.

20. The network device according to claim 14, wherein the first data is data of a physical downlink shared channel (PDSCH) or data of at least one transmission layer of the PDSCH.

* * * * *